Figure 1:
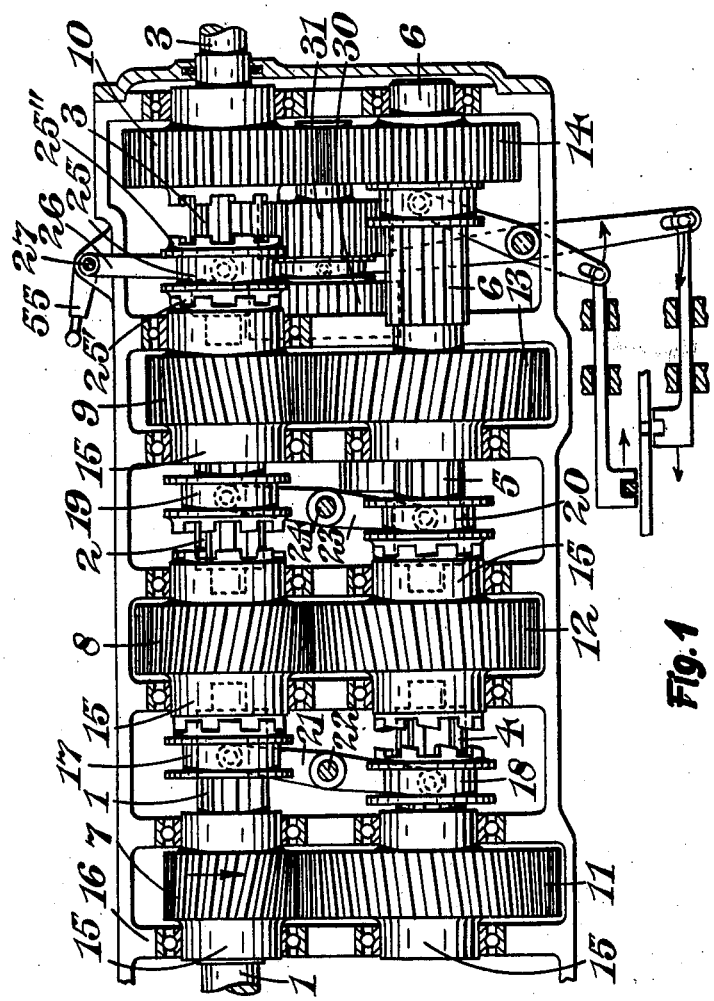

Jan. 7, 1941.  E. DAUSCH ET AL  2,227,879
CONTROL DEVICE FOR CHANGE-SPEED GEARS
Filed April 5, 1938  3 Sheets-Sheet 3
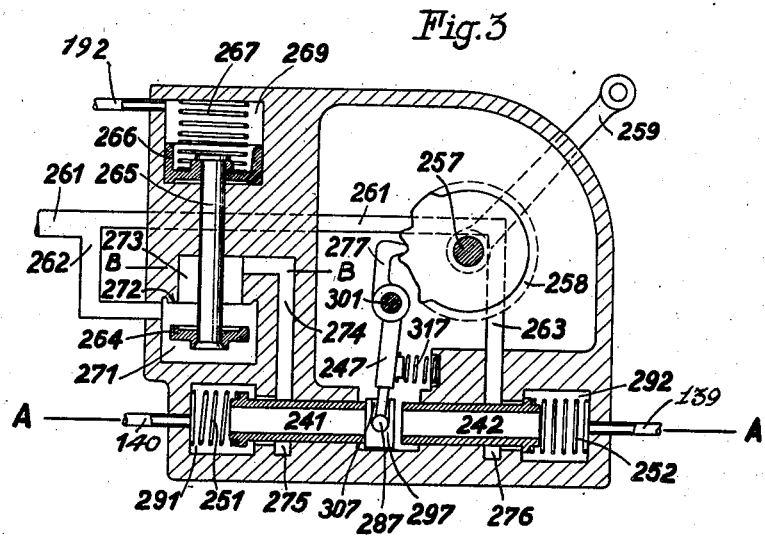
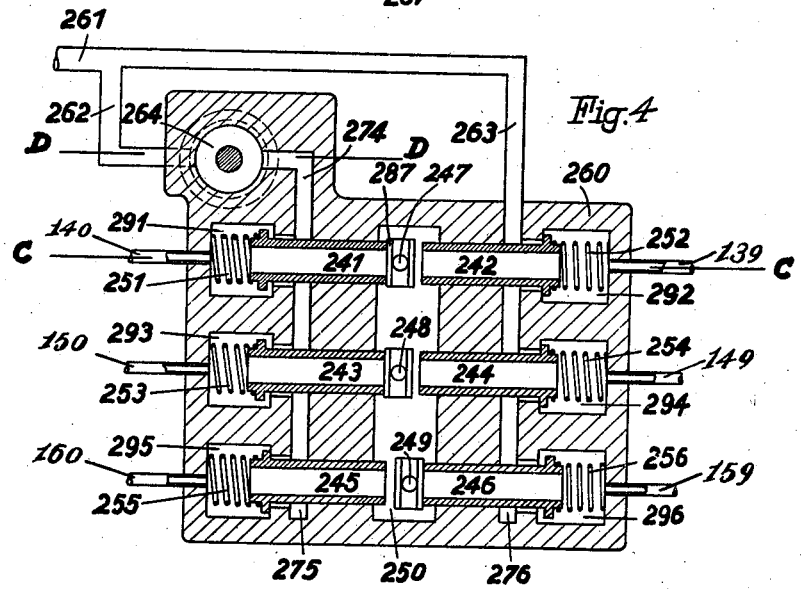
Inventors
Erwin Dausch & Gustav Meyer
By Watson, Cole, Grindle & Watson
Attorneys Patented Jan. 7, 1941

2,227,879

UNITED STATES PATENT OFFICE 2,227,879

CONTROL DEVICE FOR CHANGE-SPEED GEARS

Erwin Dausch and Gustav Meyer, Friedrichshafen-on-the-Bodensee, Germany, assignors to Maybach-Motorenbau Gesellschaft mit beschrankter Haftung, Friedrichshafen-on-the-Bodensee, Germany, a corporation of Germany Application April 5, 1938, Serial No. 200,252
In Germany July 17, 1937

12 Claims. (Cl. 74—364)

The invention relates to a control device for an auxiliary power device for operating changespeed gears, in which in changing the speed ratios, it is necessary to change a plurality of transmission stages, in particular for motor vehicles. It is employed principally in changespeed gears having a large number of speed ratios, for example six-speed gears or gears with more speeds, in particular in gears wherein at least two transmission stages are changed alternately by means of change-speed clutches, for example dog clutches, if desired without assuming a central position. Such gears are employed above all in cases where it is desired that the gear-changing operation should proceed rapidly, that is to say, the gear-changing time has to be reduced to a minimum. This purpose is served to some extent by special accelerating and retarding devices of known kind for one of the clutch members to be engaged. The invention may also be employed in gears wherein such devices are not provided.

The essential feature of the invention is that the control members controlling the auxiliary power, for example the pressure for the gearchanging cylinders of the transmission stages to be changed, are combined in two groups, one group serving for controlling the actuating members (gear-changing cylinders or gear-changing cylinder ends) of the transmission stages requiring for engagement a retardation of one of the clutch members, while the other group controls the actuating members, whereof the transmission stages require for engagement an acceleration of one of the clutch members. The principal advantages of the aforesaid combining of the control members in two groups in the manner referred to are the substantially simplified construction and the simpler operation of the control, as fewer levers are required for the operation of the control cylinders. The arrangement of the conduits from the control cylinders to the actual gear-changing device is much clearer and simpler. In the case of faults, their localisation is thereby considerably facilitated.

In a further development of the invention, each group of control members is connected to an auxiliary power supply conduit, of which at least one comprises a shut-off member whereby the retardation and acceleration gear changes are prevented from proceeding simultaneously. This ensures the shortest gear-changing time employing a simple control device having only slight losses in the auxiliary power transmission, and increases the reliability of operation of the control device.

A change-speed gear and two constructional examples of control devices therefor according to the invention are shown diagrammatically and largely in section in the accompanying drawings.

In these examples, vacuum has been assumed as the operating power.

Figure 1 shows the change-speed gear which is adapted to be controlled by means embodying the principle of the present invention. This change-speed gearing, per se, is covered by the U. S. patent to Maybach, No. 2,030,752, and the general type of gearing, of which this is an example, is covered by the Maybach U. S. Patents, Nos. 1,949,167 and 1,949,168.

Figure 2:
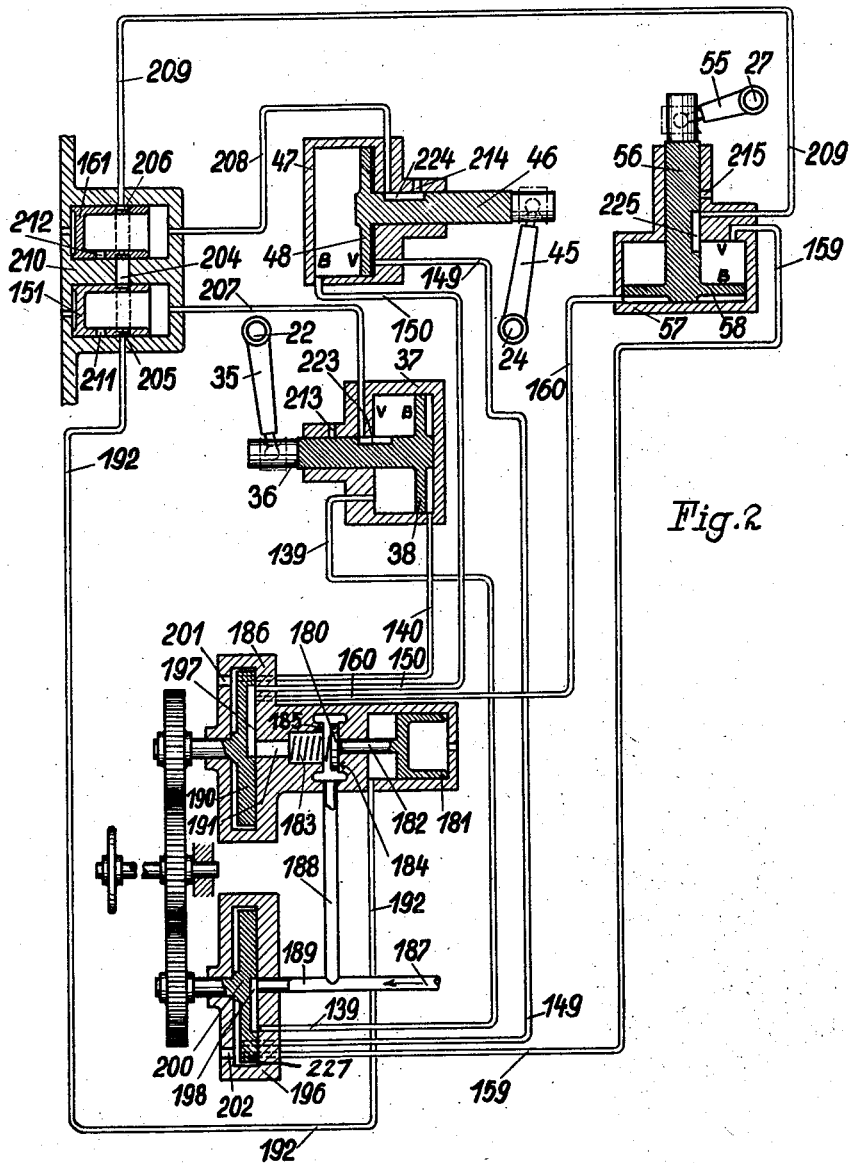

Figure 2 relates to the first example, while Figures 3 and 4 show another example differing from the first example by the fact that individual control members for the acceleration gear changes and likewise the control members for the retardation gear changes have been combined in respective groups, each having a common pressure medium supply conduit.

On the main shaft line of the change-speed gear shown in Figure 1 are the gear wheels 7, 8, 9, 10 and on the lay shaft line the gear wheels 11, 12, 13 and 14. The gear wheels 7, 9, 11 and 13 are fast on their corresponding shaft sections 1, 2, 4 and 5, or 6, while gear wheel 10 is freely rotatable on shaft section 3 and gear wheel 14 is splined on shaft section 6. Gear wheels 7, 8, 9, 11 and 12 are mounted with their hubs 15 in the housing 16, gear wheels 8 and 12 having bores in which the adjacent shaft sections 1 and 2 or 4 and 5 are mounted. Between the permanently meshed pairs of wheels 7/11, 8/12 and 9/13 are pairs of change-speed dog clutches 17, 18 and 19, 20, which in the present case, particularly for the purpose of shortening the overall length, are constructed in such a manner that the clutches 17 and 19 are in the main shaft line and the corresponding clutches 18 and 20, respectively, are in the layshaft line. The gear changing lever 21 connecting the clutches 17 and 18 together is secured to a shaft 22 and the gear-changing lever 23 for actuating the clutches 19 and 20 is secured to a shaft 24. In addition, on the shaft section 3, is splined a double dog clutch 25, its teeth 25' being adapted to be brought into engagement with corresponding dog teeth of the gear wheel 9, and its teeth 25" being adapted to be brought into engagement with corresponding dog teeth on the gear wheel 10. The gear-changing lever 26 for this change-speed dog clutch 25 is fast on a shaft 27. The clutch teeth of all the clutches (17, 18; 19, 20; 25) are provided with bevelled end faces, whereby engagement of the clutches is effected in known manner at the moment of overtaking.

Mounted slidably on a further short lay-shaft is a reversing drive 30, 31, the gear wheel 30 whereof can be brought into engagement with the gear wheel 14, when the latter has been shifted to the left, and its gear wheel 31 can be brought into engagement with the gear wheel 10. The selection of the reverse speed is effected by mechanical means which do not form part of the present invention and will therefore not be further described.

The bevelling of the end faces of the dogs indicated in Figure 1 corresponds to the direction of rotation shown at wheel 7 in Figure 1. Starting for example from the engagement of the clutch 17 with the clutch member provided on gear wheel 8, as indicated in Figure 1, and if instead thereof the clutch 18 is to be brought into engagement with the corresponding clutch member mounted on gear wheel 12, then when the dogs of clutch 18 are applied to the dogs connected to gear wheel 12, the latter dogs will first be running more quickly and will therefore reject the dogs of clutch 18 (position of rejection). If now, by opening the throttle, the driver increases the speed of gear wheel 7 and hence also of gear wheel 11 and of the clutch 18 connected to shaft 4 of said gear wheel 11, the clutch 18 will finally overtake the counter-clutch member connected to gear wheel 12 and the engagement of the clutch will be effected in known manner.

Engagement takes place in a similar manner when clutch 18 is brought out of engagement and clutch 17 is engaged. In this case, the clutch member connected to gear wheel 8 is the more slowly running member. The dogs of the, at first, more rapidly running clutch 17, which move past the said clutch member connected to gear wheel 8 will be rejected until, due to the diminishing speed of the engine resulting from the driver closing the throttle, their speed will also fall below that of the clutch member connected to gear wheel 8, engagement then taking place.

If the gear mechanism shown in Figure 1 permitting eight forward and four reverse speeds is employed as a seven speed gear, the following sequence of speeds may be obtained for example, 29 teeth being provided for example on the gear wheel 7, 40 teeth on gear wheel 8, 35 on gear wheel 9, 44 on gear wheel 10, 60 on gear 11, 48 on gear wheel 12, 53 on gear wheel 13 and 22 teeth on gear wheel 14:

Forward

I. Shaft 1, gear wheel 7, gear wheel 11, shaft 4, clutch 18, gear wheel 12, gear wheel 8, clutch 19, shaft 2, gear wheel 9, gear wheel 13, shaft 6, gear wheel 14, gear wheel 10, clutch 25'', shaft 3.

II. Shaft 1, gear wheel 7, gear wheel 11, shaft 4, clutch 18, gear wheel 12, clutch 20, shaft 5, gear wheel 13, shaft 6, gear wheel 14, gear wheel 10, clutch 25'', shaft 3.

III. Shaft 1, clutch 17, gear wheel 8, clutch 19, shaft 2, gear wheel 9, gear wheel 13, shaft 6, gear wheel 14, gear wheel 10, clutch 25''.

IV. Shaft 1, gear wheel 7, gear wheel 11, shaft 4, clutch 18, gear wheel 12, gear wheel 8, clutch 19, shaft 2, gear wheel 9, clutch 25', shaft 3.

V. Shaft 1, gear wheel 7, gear wheel 11, shaft 4, clutch 18, gear wheel 12, clutch 20, shaft 5, gear wheel 13, gear wheel 9, clutch 25', shaft 3.

VI. Shaft 1, clutch 17, gear wheel 8, clutch 19, shaft 2, gear wheel 9, clutch 25', shaft 3 (direct drive).

VII. Shaft 1, clutch 17, gear wheel 8, gear wheel 12, clutch 20, shaft 5, gear wheel 13, gear wheel 9, clutch 25', shaft 3 (speed shown in drawings).

A reverse drive is for example

Shaft 1, gear wheel 7, gear wheel 11, shaft 4, clutch 18, gear wheel 12, gear wheel 8, clutch 19, shaft 2, gear wheel 9, gear wheel 13, shaft 6, gear wheel 14, gear wheel 30, gear wheel 31, gear wheel 10, clutch 25'', shaft 3.

In Figure 2, 22, 24 and 27 again denote the gear-changing shafts of the gear-wheel change-speed gear shown in Figure 1. Mounted on said gear-changing shafts are levers 35, 45 and 55 connected to which are piston rods 36, 46 and 56, the pistons whereof are arranged in cylinders 37, 47 and 57. Connected to one end of these cylinders respectively are the conduits 139, 149 and 159, and at the other end the conduits 140, 150 and 160. The end positions of the pistons 38, 48 and 58 are denoted by B or V, according to whether the transfer of these pistons into the denoted position is accompanied by an acceleration or retardation gear change. Furthermore, 190 denotes a distributing valve controlling the conduits 140, 150, 160; and 22 is a further distributing valve controlling the conduits 139, 149, 159. 180 is a shut-off valve which is moved by the piston 181 acting through the pin 182 and is held by a spring 183 in the opened position against the surface 184. 185 is the seat of the valve in the housing 186. 187 is a supply conduit for pressure medium which in the present case is connected to the induction pipe of the engine. This conduit forks into the two branches 188 and 189 leading to the two housings 186 and 196 of the distributing valves 190 and 200. 191 is a passage in the housing 186, and 192 is a communicating conduit. 197 and 198 are control grooves in the distributing valves 190 and 200. 201 and 202 are bores in the housings 186 and 196, through which the inner chambers of these housings are connected to the outer air. 227 and 228 are bores in the valve 200. Further control grooves and bores in these valves are not particularly shown in the drawings.

151 and 161 are two shut-off slide valves arranged in the housing 210 and are connected to the cylinders 37 and 47 by the conduits 207 and 208. 209 is a connecting conduit between the cylinder 57 and the housing 210. The pistons 151 and 161 have short passages 211 and 212 and also annular grooves 205 and 206. 204 is a connecting passage between the two guide bores for the pistons 151 and 161 in the housing 210.

The piston rods 36, 46 and 56 are provided with grooves 223, 224 and 225. In the extensions of the cylinders 37, 47 and 57 guiding the piston rods are bores 213, 214 and 215 which are in communication with the outer air.

The operation of the control device shown in Figure 2 is as follows:

In the drawings, the pistons of the gear-changing cylinders are shown in the positions corresponding to the second speed. The distributing valves 190 and 200 appropriately coupled together have been just set to the position corresponding to the third speed. For changing over to 3rd speed, the pistons 38 and 48 must be moved to their left-hand end position, the transmission stage pertaining to the cylinder 37 being thereby engaged with retardation of one clutch member, and the transmission stage pertaining to the cylinder 47 being engaged with acceleration of one clutch member. The conduit 150 is connected by the control groove 197 of the distributing valve 190 to the passage 191 supplying the vacuum. At the same time, the control groove 198 of the distributing valve 200 connects the conduit 139 to the vacuum supply conduit 189. The vacuum acting through the conduit 139 on the piston 38 moves the latter out of its right-hand end position still shown in the drawings at first so far to the left until the corresponding clutch member of the gear is in the position of rejection at the counter-clutch member. Engagement does not yet take place since the driving clutch member is rotating more rapidly than the counter-clutch member.

In these positions, the vacuum existing on the left of the piston 38 passes via the groove 223 and conduit 207 to the housing 210 and draws the small valve 151 to the right. The bore 211 is thereby brought in front of the connection of the conduit 192, while simultaneously the passage 204 opposite is shut off. The vacuum supplied through the conduit 207 now enters the conduit 192 and through the latter into the space on the left in front of the small piston 181. The piston 181 is thereby moved to the left and the valve 180 is applied to the seat 185 against the pressure of the spring 183. The supply of vacuum from the conduit 187 via the branch conduit 188 to the passage 191 is thereby interrupted. Although the conduit 150 is connected to the vacuum supply conduit by the distributing valve 190, no vacuum can enter the conduit 150. The piston 48 therefore at first remains in its right-hand end position.

If, due to the reduction in speed of the engine, the engagement speed of the clutch member moved by the piston 38 has been attained, the said clutch member is able to engage and the piston 38 is able to move completely into its left-hand end position, the right-hand edge of the groove 223 first shutting off the supply of vacuum to said groove from the space on the left in front of the piston 38. When the piston 38 has moved completely into its left-hand end position, the conduit 207 is connected by the groove 223 to the bore 213, through which the space on the right of the piston valve 151 is now connected to the outer air via the conduit 207 and the groove 223. The piston valve 151 is thereby returned into its left-hand end position. The conduit 192 is thereby connected via the annular groove 205, connecting passage 204 and the annular groove 206 as well as the conduit 209 and the groove 225 in the rod 56 of the piston 58 with the space above the piston 58, and via the conduit 159, corresponding bore 227 in the valve 200, space above this valve and the bore 202 in the valve housing with the outer air. Due to the pressure of the outer air supplied in this way via conduit 192 to the space on the left in front of the piston 181, the piston 181 is again returned into its right-hand end position and the valve 180 is lifted off its seat by the pressure of its spring 183 and is applied against the surface 184.

Vacuum is now able to pass from the conduit 188 via the passage 191 and control groove 197 in the distributing valve 190 to the conduit 150. The piston 48 is thereby drawn to the left, the clutch member actuated by the latter is applied to the counter-clutch member where it is at first rejected on account of its higher speed. It comes into engagement as soon as the overtaking speed has been attained by opening the throttle, the piston 48 moving into its left-hand end position. The gear changing operation is thus terminated.

In this gear-change, the groove 224 on the piston rod 46 does not exert any effect on the valve 161, since the space to the right of the piston 48 and hence also the conduit 208 in this gear change do not have any vacuum supplied to them, but remain in communication with the outer air through the conduit 149, corresponding bore in the distributing valve 200, space above said valve and the bore 202 in the valve housing.

As will be immediately appreciated from the drawings, if one of the two cylinders 37 or 47 is carrying out a retardation gear change and simultaneously a gear change of cylinder 57 is adjusted by the distributing valves 190 and 200, an acceleration gear change of the cylinder 57 is prevented, in the same way as described above, by the valves 151 or 161 by means of the main shut-off valve 180. Acceleration gear changes of the cylinders 37, 47, however, are also prevented while the cylinder 57 is performing a retardation gear change. This is effected by the fact that in the case of a retardation gear change of the cylinder 57, the vacuum supplied through the conduit 209 to the valve 161 passes by way of the groove 206, passage 204, and groove 205 into the conduit 192 and by moving the piston 181 to the left closes the valve 180 upon its seat 185.

The form of construction of a device according to the invention as shown in Figures 3 and 4 is likewise suitable for the change-speed gear shown in Figure 1 and replaces the selector valve assembly shown in the lower half of Figure 2. In this construction each of the six conduits leading to the gear-changing cylinders is provided with a separate control valve. Figure 3 is a vertical section through the device and Figure 4 is a horizontal section substantially along the plane of section A—A of Figure 3, but in the left-hand top corner of Figure 4, the section is taken along the plane B—B. The vertical section shown in Figure 3 is substantially along the vertical plane represented by the line C—C in Figure 4, but in the left-hand part of Figure 3, a section along plane D—D is also shown.

In Figures 3 and 4, 241, 242, 243, 244, 245 and 246 denote control valves loaded by the springs 251, 252, 253, 254, 255 and 256, each valve which is denoted by an odd number and the valve denoted by the following even number being moved by one of the levers 247, 248, 249. Said levers are mounted in the chamber 250 of the housing 260 and are actuated by means of a lever 259 through cam discs mounted on the spindle 257. Figure 3 shows the cam disc 258 for actuating the lever 247. 261 is the vacuum supply conduit, and 262 and 263 are branches off this conduit. 264 is a shut-off valve, the stem 265 of which is connected to a piston 266 which is under the action of a spring 267. 192 is a controlled supply conduit leading from the housing 210 of Figure 2 to the space 269 above the piston 266. 271 is the chamber containing the seat 272 of valve 246. 273 is the chamber above this valve, and connected to it is an elbow passage 274 opening into the chamber 275. Conduit 263 opens into the chamber 276. 140, 150, 160, 139, 149 and 159 are control conduits connected to the chambers 291, 293, 295, 292, 294 and 296 situated behind the valves 241, 243, 245, 242, 244 and 246 and leading to the corresponding gear-changing cylinders as shown in Figure 2. The levers 247, 248 and 249 are loosely rotatable on a common spindle 301. The lever 247 comprises in its upper part a nose 277, while at the end of its lower part is a ball 287 surrounded by a shoe 297. A spring 317 presses against the lower part of the lever 247. The levers 248 and 249 are constructed similarly.

The operation of the device shown in Figures 3 and 4 is fundamentally the same as described in the case of Figure 2. When the shaft 257 and with it the cam discs are rotated by the lever 259, the lever 247 for example is raised from the position shown in Figure 3, in which its nose 277 lies in the corresponding groove of the cam disc 258, so that the nose 277 reaches the top of the following cam of the disc 258. By means of the spherical lower end 287 of the lever, the shoe 297 is thereby driven to the right and the valve 241, which up to this point has assumed the opened position shown in Figure 3, is closed. At the same time, the shoe 297 comes in front of the left-hand end of the valve 242, whereby the latter is opened. In this way, the supply of vacuum to the right hand end of the cylinder 37 connected to the control conduit 140 is closed, while the connection of the vacuum supply conduit 263 via the chamber 276 with the conduit 139 and with the left hand end of the cylinder 37 connected to the latter is opened.

Upon the actuation of the cam discs, according to the control adjustments which are precisely necessary for the speed ratio to be engaged and hence according to the cams provided on said discs, the valves 241, 243, 245 of the acceleration gear-change group arranged on the left and also the valves 242, 244, 246 of the retardation gear-change group arranged on the right will be moved in the same way as described above, by means of the three levers 247, 248, 249. If it is not necessary to disengage or engage a transmission stage, the corresponding valves remain in the opened or closed position, respectively, due to the fact that the nose of the corresponding lever in these cases remains either on a groove of the corresponding cam disc, said groove extending over the next division or on the periphery of the corresponding cam, said periphery extending over the next cam division.

In the same way as is shown in the construction according to Figure 2, the conduit 192 is controlled by the gear-changing pressure operative in the cylinders in such a manner that in Figures 3 and 4, the valve 264 corresponding to the valve 180 of Figure 2 is applied to its seat 272 in the case of a retardation gear-change of one or the other cylinder. The supply of vacuum from the conduit 262 via valve 264, chamber 273 and elbow passage 274 to the common chamber 275 situated in front of the valves 241, 243 and 245 is thereby shut off until the retardation gear-change concerned is terminated, and the acceleration gear-change of the one or the other of the other cylinders can proceed.

We claim:

1. A gear-shifting mechanism for a gear-wheel change-speed gear comprising: a plurality of power-operated gear-shifting devices, two conduits leading to each of said devices for carrying working medium thereto for operation in opposite directions to and from two positions of adjustment, a source of working medium, and a control means between said source and each of said conduits, the control means being arranged in two separate groups, each group comprising a control means pertaining to one of the positions of adjustment of each of said power-operated gear-shifting devices.

2. A gear-shifting mechanism for a gear-wheel change-speed gear comprising: a plurality of power-operated gear-shifting devices, two conduits leading to each of said devices for carrying working medium thereto for operation in opposite directions to and from two positions of adjustment, a source of working medium, and a control means between said source and each of said conduits, said control means each comprising a separate control member and being arranged in two groups, each group comprising a control means pertaining to each of said power-operated gear-shifting devices.

3. A gear-shifting mechanism for a gear-wheel change-speed gear comprising: a plurality of power-operated gear-shifting devices, two conduits leading to each of said devices for carrying working medium thereto for operation in opposite directions to and from two positions of adjustment, a control means connected to each of said conduits, the control means being arranged in two groups, each group comprising a control means pertaining to each of said power-operated gear-shifting devices, and two conduits, one common to the control means of each group, for carrying working medium to said control means.

4. A gear-shifting mechanism for a gear-wheel change-speed gear comprising: a plurality of power-operated gear-shifting devices, two conduits leading to each of said devices for carrying working medium thereto for operation in opposite directions, a control means connected to each of said conduits, said control means each comprising a separate control member and being arranged in two groups, each group comprising a control means pertaining to each of said power-operated gear-shifting devices, two conduits, one common to the control means of each group, for carrying working medium to said control means, a shut-off device in one of said last-mentioned conduits, and means responsive to working medium passing any of the control means connected to the other of said last-mentioned conduits for actuating said shut-off device.

5. A transmission comprising in combination a gear-wheel change-speed gear of the kind having disengageable positive engaging gear-change members for effecting changes of ratio, acceleration of the driving shaft being necessary for the engagement of some of said gear-change members and retardation of the driving shaft being necessary for the engagement of others, and in which the selection of at least one of the gear ratios requires the engagement of gear-change members requiring acceleration and of gear-change members requiring retardation, and a gear-shifting mechanism comprising a plurality of power-operated gear-shifting devices operatively connected with said gear-change members, two conduits leading to each of said devices for carrying working medium thereto for operation in opposite directions, a source of working medium, and a control means between said source and each of said conduits, the control means being arranged in two groups, one group comprising all the control means pertaining to conduits for carrying working medium to said gear-shifting devices for the operation thereof in the direction for engaging gear-change members requiring acceleration of one of the members to be engaged, and the other group comprising the control means pertaining to the other conduits.

6. A transmission as claimed in claim 5, in which each control means comprises a separately movable control member.

7. A transmission as claimed in claim 5, in which each group of control means comprises a conduit common to the group for carrying working medium thereto.

8. A transmission as claimed in claim 5, comprising a separately movable control member for each control means, a conduit common to each group of control means for carrying working medium thereto, a shut-off device in one of said common conduits, and means responsive to working medium passing any of the control means connected to the other of said common conduits for actuating said shut-off device.

9. A transmission as claimed in claim 5, comprising a separately movable control member for each control means, a conduit common to each group of control means for carrying working medium thereto, a shut-off device in said conduit common to the group of control means pertaining to conduits for carrying working medium to said gear-shifting devices for the operation thereof in the direction for engaging gear-change members requiring acceleration of one of the members to be engaged, and means responsive to working medium passing any of the control means connected to the other of said common conduits for actuating said shut-off device.

10. A gear-shifting mechanism for a gear-wheel change-speed gear comprising a plurality of power-operated gear-shifting devices, two conduits leading to each of said devices for carrying working medium thereto for operation in opposite directions, a control means connected to each of said conduits, the control means being arranged in two groups, each group comprising a control means pertaining to each of said power-operated gear-shifting devices, two conduits, one common to the control means of each group, for carrying working medium to said control means, a shut-off device in one of said last-mentioned conduits, and means responsive to working medium passing any of the control means connected to the other of said last-mentioned conduits for actuating said shut-off device.

11. A transmission as claimed in claim 5 in which there is provided a conduit common to each group of control means for carrying working medium thereto, a shut-off device in one of said common conduits, and means responsive to working medium passing any of the control means connected to the other of said common conduits for actuating said shut-off device.

12. A transmission as claimed in claim 5 in which there is provided a conduit common to each group of control means for carrying working medium thereto, a shut-off device in said conduit common to the group of control means pertaining to conduits for carrying working medium to said gear-shifting devices for the operation thereof in the direction for engaging gear-change members requiring acceleration of one of the members to be engaged, and means responsive to working medium passing any of the control means connected to the other of said common conduits for actuating said shut-off device.

ERWIN DAUSCH.
GUSTAV MEYER.